No. 889,711. PATENTED JUNE 2, 1908.
J. McCARTHY.
LATHE DOG.
APPLICATION FILED MAY 2, 1907.
2 SHEETS—SHEET 1.
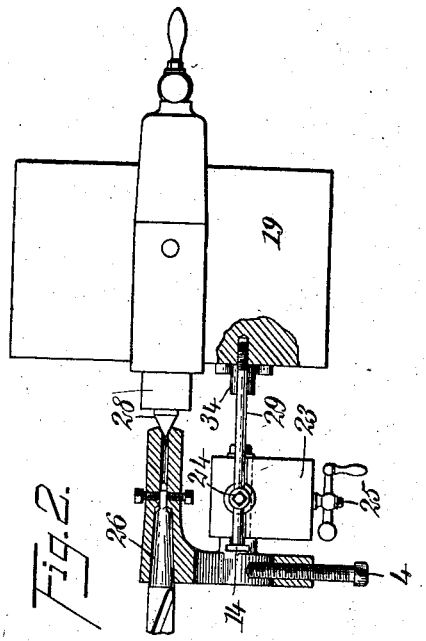
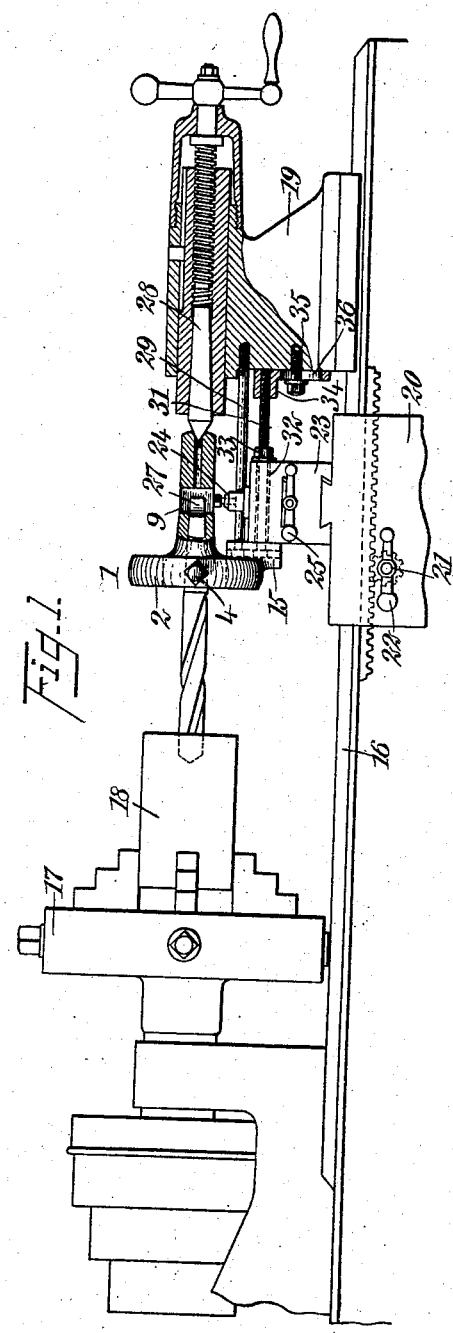
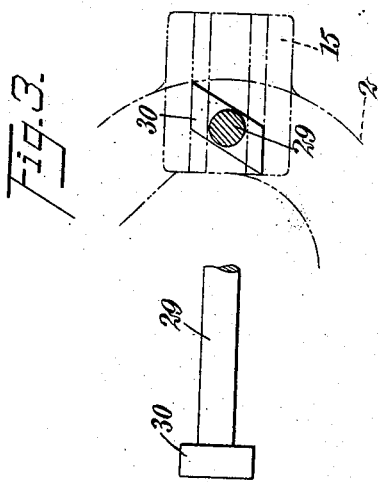
WITNESSES
INVENTOR
James McCarthy
BY
ATTORNEYS No. 889,711.

PATENTED JUNE 2, 1908.

J. McCARTHY.
LATHE DOG.
APPLICATION FILED MAY 2, 1907.

2 SHEETS—SHEET 2.

WITNESSES

INVENTOR
James McCarthy
BY
ATTORNEYS

UNITED STATES PATENT OFFICE.

JAMES McCARTHY, OF PLAINFIELD, NEW JERSEY.

LATHE-DOG.

No. 889,711.　　　Specification of Letters Patent.　　　Patented June 2, 1908.

Application filed May 2, 1907. Serial No. 371,433.

*To all whom it may concern:*

Be it known that I, JAMES McCARTHY, a citizen of the United States, and a resident of Plainfield, in the county of Union and State of New Jersey, have invented a new and Improved Lathe-Dog, of which the following is a full, clear, and exact description.

This invention relates to machine tools, and especially to lathe dogs.
The object of the invention is to produce a lathe dog which will be capable of the ordinary uses of this tool, but which will have such a construction as will enable it to be used as a tool holder in performing certain lathe operations.

A further object of the invention is to provide an arrangement when used in the manner suggested, that will operate to feed the tool automatically to the work.
The invention consists in the construction and combination of parts to be hereinafter more fully described and particularly set forth in the claims.

Reference is to be had to the accompanying drawings forming a part of this specification, in which similar characters of reference indicate corresponding parts in all the figures.

Figure 5:
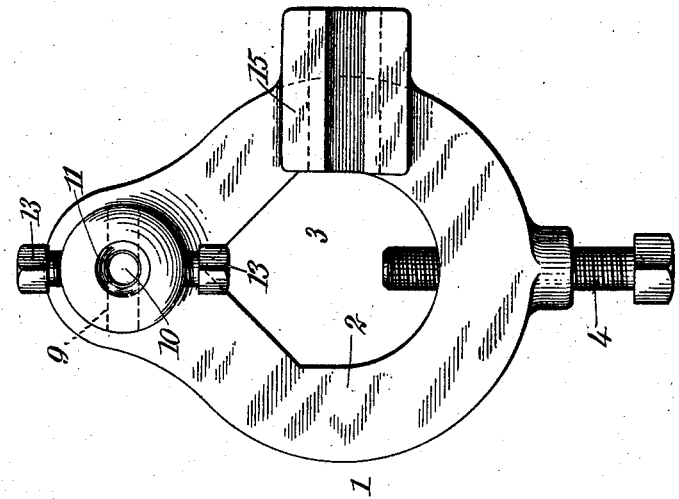
Figure 4:
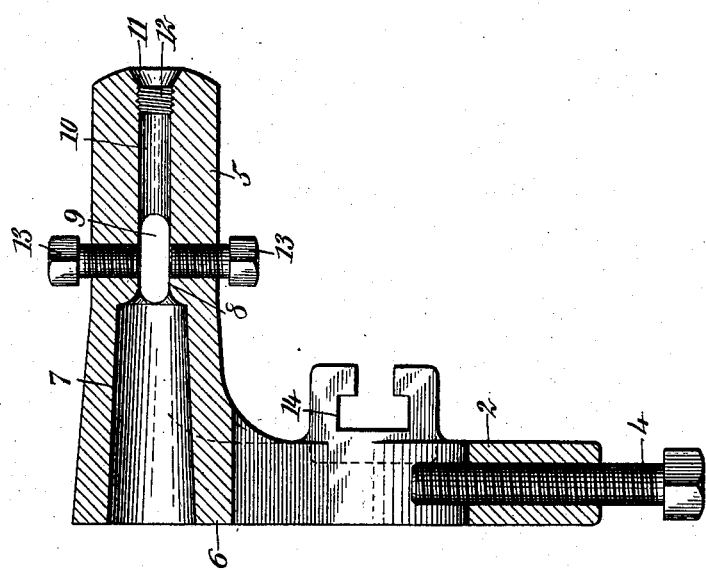

Figure 1 is a side elevation showing a portion of a lathe and illustrating the manner in which the dog is employed when used as a tool holder; parts of this view are broken away and shown in section; Fig. 2 is a plan of the tail stock, a portion of which is broken away, the tool holder being represented in section; the tool rest is shown in plan; Fig. 3 is a view representing a bolt in side elevation and in cross section; a portion of this view is broken away, and in dotted lines a portion of the lathe dog is indicated to illustrate the manner in which the bolt may be attached thereto; Fig. 4 is a longitudinal section through the dog constructed according to my invention; and Fig. 5 is an end elevation or base view of the dog.
Referring more particularly to the parts, and especially to Figs. 4 and 5, 1 represents the dog. The body 2 of this dog presents the usual eye 3 in which a piece of work may be clamped by means of a clamping screw 4 which screws in through the lower side of the dog as shown. Opposite the clamping screw 4 the dog is provided with a tail 5 which projects substantially at right angles to the body 2. Through the forward face 6 of the dog a tapered bore 7 passes, which lies axially in the tail of the dog, as shown. This bore constitutes a socket for the shank of the tool. At the inner end of this bore or socket a recess 8 is formed, opposite which a transverse slot 9 is formed in the tail of the dog, as indicated, and beyond this opening a bore 10 of reduced diameter is formed, which extends to the end of the tail, where a small conical counterbore 11 is formed. Just within this counterbore 11 the bore 10 is provided with a screw thread 12 for a purpose which will appear more fully hereinafter.

At the recess 8 I provide oppositely disposed clamping screws 13 mounted in the tail of the dog, and these are adapted to secure a tool in the socket, as will be described more fully hereinafter.

On the rear face of the body of the dog, as indicated in Fig. 5, there is formed an undercut or tee-slot 14, the longitudinal axis of which extends at right angles to the axis of the bolt 4. This tee-slot 14 is produced by forming the face of the dog with an upwardly projecting boss or guide 15, and this guide preferably projects slightly at the side of the dog, as shown in Fig. 5.

A dog constructed as described can evidently be used as an ordinary lathe dog for driving work held upon the live center or face plate. In addition to this, it has further uses in holding a tool such as a drill or reamer, and its utility in this connection will now be described, referring especially to Figs. 1 to 3. In Fig. 1 I illustrate a lathe having a bed 16, the spindle of the lathe being provided with a chuck 17 in which a piece of work 18 is clamped in the usual manner. On the bed 16 opposite the spindle, a tail stock 19 is slidably mounted, and between the chuck and the tail stock a carriage 20 is provided, with an automatic feed 21 controlled by means of a handle 22 of any suitable construction. Upon the carriage 20 a cross feed or tool rest 23 is provided, said rest consisting of a block having the usual tool post 24, the said rest being advanced by means of a suitable handle 25 operating the cross feed.

Suppose that it is proposed to drill the piece of work 18; in order to do this, the shank 26 of the drill is inserted in the tapered bore 7 so that the tang 27 of the shank passes up into the transverse groove or slot 9. The dog is then applied to the tail stock so that the point of the dead center 28 is seated in the counterbore 11.

I provide means for securely holding the dog to the tool rest 23, and to the tail stock. For this purpose, I provide a bolt 29 which is provided with a tee-head 30 cut on an inclination, as indicated in Fig. 3. The head of this bolt is inserted in the tee-slot 14 and is then rotated until its inclined end faces come against the side of the slot, as will be readily understood, and as shown in Fig. 3. Before inserting the bolt head in the slot as suggested, the bolt is secured in the forward face of the tail stock, for which purpose its end is threaded as indicated. The body of the bolt passes through the tool post 24, so that it may be clamped to the rest as shown.

In addition to the bolt 29 I provide a bolt 31 which has a tee-head similar to the tee-head 30 of the bolt 29. This bolt like the bolt 29, is disposed in a horizontal position and passes through a horizontal opening 32 in the tool rest; it is threaded so as to receive a nut 33 which affords means for clamping the tool rest against the rear face of the dog. This bolt is threaded continuously to its extremity and screws into an anchor plate 34 which is attached on the forward face of the tail stock by means of a clamping bolt 35 passing through a slot 36. By this construction the position of the bolt may be adjusted as desired. In practice, the dog is most conveniently applied to the bolt heads by sliding it in a horizontal direction over the heads whereupon the bolts will be rotated to lock their heads in the slot; then the dead center 28 may be advanced so as to engage the tail of the dog, as illustrated. With this construction it should now be understood that the dog will be rigidly secured to the tool rest, while the rear end of the tail of the dog is held in position by the tail stock. It will be understood that the fact that the face of the dog is clamped against the tool rest, insures that a proper alinement of the drill will result. In this connection attention is drawn to the fact that the bolt 31 operates especially for the purpose of clamping the dog to the tool rest, while the bolt 29 insures that the dead center 28 will be maintained in contact with the tail of the dog. With the parts in this relation as described, the automatic feed of the lathe will be set by means of the handle 22, and when the lathe is driven, the carriage will be advanced automatically, as will be readily understood. Of course, with the carriage the tail stock advances, together with the dog; these parts all advancing as though composed of a single piece; in this way the tool is fed to the work.

While I have illustrated the tail stock as holding a drill, it could as well be used for holding a reamer or any other similar tool. When used with a reamer, the automatic feed is especially advantageous, as it overcomes the tendency which reamers sometimes have, to feed themselves into the work so fast as to become stuck. In this connection the clamping screws 13 are especially useful, as they rigidly attach the tool to the dog. These clamping screws are also useful in holding a tool in the socket 7, which is too small to fit the socket.

The presence of the slot 9 facilitates the removal of the tool by driving a drift through the tail of the dog behind the tang. In addition to this, the tool may be started from its socket by screwing a small plug into the bore 10. The plug will have a thread engaging with the thread 12, and the extremity of the plug will come against the tang so as to force the tool outwardly, as will be readily understood.

Having thus described my invention, I claim as new and desire to secure by Letters Patent:

1. A lathe dog having a socket in the tail thereof adapted to hold the shank of a tool, and having a seat for the tail center opposite said socket.

2. A lathe dog having a socket in the tail thereof adapted to receive the shank of a tool, and having an opening in said tail opposite said socket, adapted to be applied to the dead center of the lathe, the body of said dog having means for attaching a removable fastening thereto.

3. A lathe dog having a tail with a socket formed in one end thereof, and an opening in the opposite end of said tail adapted to be applied to the dead center of the lathe, said dog having a body with means formed thereon for removably engaging a bolt head, and a removable bolt having a head adapted to attach to said dog.

4. A lathe dog having a body and a tail, said tail having a socket in one end thereof adapted to receive the shank of a tool, and having an opening in the other end of said tail adapted to be applied to the dead center of the lathe, said body having a tee-slot formed therein, and a removable bolt having its head in said tee-slot and adapted to connect with the tail stock.

5. A lathe dog having a tail with a socket formed in one end thereof, and having an opening opposite said socket adapted to be applied to the tail center of the lathe, said dog having a substantially flat face adapted to seat against the face of the tool rest, and means for clamping the same upon the face of the tool rest.

In testimony whereof I have signed my name to this specification in the presence of two subscribing witnesses.

JAMES McCARTHY.

Witnesses:
G. W. V. Moy,
Howard C. Tracy.